Dec. 6, 1932.   A. H. PARDEW   1,890,262
SOLDERING APPARATUS
Filed May 18, 1929
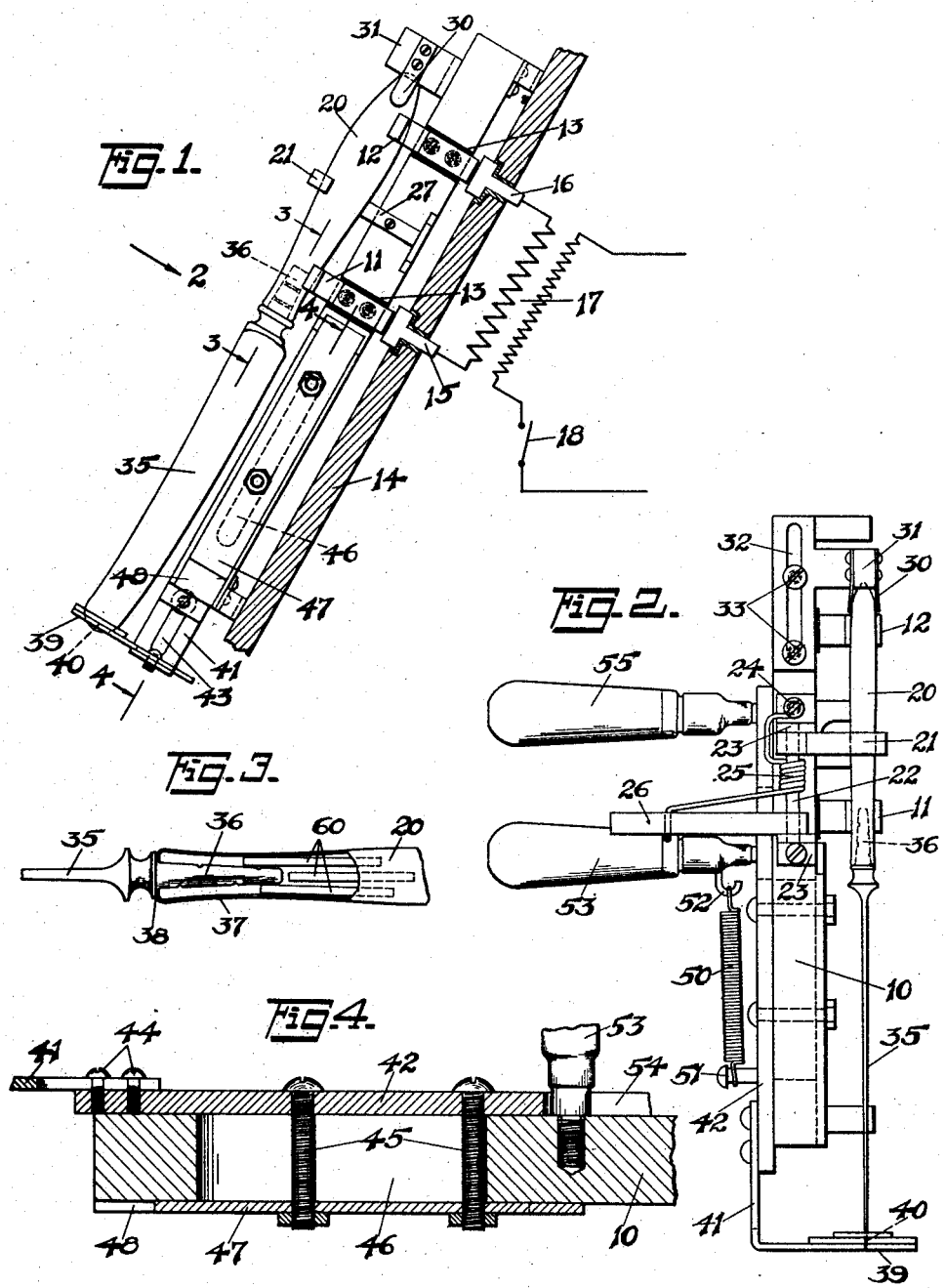

Patented Dec. 6, 1932

1,890,262

UNITED STATES PATENT OFFICE

ARTHUR H. PARDEW, OF SHERRILL, NEW YORK, ASSIGNOR TO ONEIDA COMMUNITY, LIMITED, OF ONEIDA, NEW YORK, A CORPORATION OF NEW YORK

SOLDERING APPARATUS

Application filed May 18, 1929. Serial No. 364,227.

This invention relates to apparatus for soldering articles, and particularly soldering handles to knives.

The invention generally is intended to simplify and perfect the soldering process, to render the process more reliable and effective, and to provide a strong soldered joint between the connected parts.

Hitherto, in soldering articles, such as handles to knives, the solder has been melted by application of external heat, as by a torch or the like, which acted on the surfaces of the articles and tarnished or injured such surfaces. As a consequence, the plating or other form of finish had to be applied after the parts had been soldered.

It is an object of the invention to supply the heat for melting the soldering in a manner such as not to affect the surfaces detrimentally and thus permit soldering after the plating or finish has been applied.

A further object of the invention is to utilize the heating effect of an electric current for melting the solder.

Another object is to produce a soldering apparatus for holding the parts to be soldered firmly in correct position during the process, for permitting convenient assembly and disassembly of the parts, and for applying the current thereto in an efficient and convenient manner.

With these general objects in view, the invention consists in the features, combinations, arrangements of parts, and details of construction, which will first be described in connection with the accompanying drawing and then more particularly pointed out.

In the drawing:—

Figure 1 is a side elevational view, partly in section, and partly diagrammatic, of an apparatus constructed in accordance with the present invention;

Figure 2 is a face view of the apparatus, looking in the direction of the arrow of Figure 1;

Figure 3 is a cross-section as on line 3—3 of Figure 1; and

Figure 4 is a cross-section as on line 4—4 of Figure 1.

In the illustrated embodiment, the apparatus comprises a frame such as an elongated bar, 10, of rectangular or other cross-section, to which are fastened two electrodes, 11, 12, in spaced relation and electrically insulated from the bar by insulating material, 13. The bar is positioned on a base 14 in substantial parallelism therewith. The bar is preferably removably attached to the base and may be taken off to allow the operator to remove and load the apparatus. The base 14 is of any suitable material, preferably insulating material, such as slate. When the apparatus is positioned on the base, electrodes 11, 12, engage cooperating electrodes 15, 16 on the base. The latter electrodes are included in an electric circuit, 17, indicated diagrammatically in the drawing. The circuit includes a source of current (not shown) and a switch, 18, for controlling the circuit. The base and bar are advantageously arranged at an angle to the horizontal, preferably a small angle, such as 10 degrees, for a purpose presently to appear. The bar may be attached to the base in any desired or preferred manner, either by permanent or temporary attaching means.

Means are provided for clamping a part to be soldered in the apparatus and in series in the circuit. In the example shown, this part is the handle, 20, of a table knife. Although capable of various constructions, the clamping means herein shown comprise a clamping element, 21, attached to a shaft, 22, the latter being journaled in bearings, 23, secured to the frame bar, 10, as by set screws 24. The clamping element extends over the handle of the knife and bears on the top thereof so as to urge it down against electrodes, 11, 12. If desired, the clamping element may carry a shield for covering or partially covering the knife handle to conceal the latter and to protect the handle from dirt and splashing solder. A spring, 25, is utilized to force the clamping element in a downward direction and to cause it to clamp firmly the handle in position. The spring is coiled partly around the shaft, 22, has one end secured rigidly to the bar as by one of the set screws, 24, and has its other end attached to a handle, 26, which projects laterally from the shaft and is fastened thereto. The spring normally tends to turn the handle, shaft, and clamping element in a way to cause the clamping element to act against the knife handle. The handle, 26, may be manipulated, however, to move the clamping element back and release the knife handle. Such manipulation permits the knife handle to be inserted or removed conveniently from the apparatus. A stop, 27, may be employed to limit the movement of the clamping element under spring action. In the illustrated embodiment, the stop is a short piece of metal fastened to bar, 10.

Means may be provided for positioning and aligning the knife handle in the apparatus prior to clamping. This means is exemplified as a pair of spring fingers, 30, attached in spaced relation to a carrier, 31. The carrier is fastened to bar, 10, preferably in an adjustable manner. To this end, the carrier may have an elongated slot, 32, through which extend set-screws, 33, into the bar. The adjustable carrier with its spring fingers acts as a gauge for the end of the handle and to take the thrust on the handle and knife. In addition, it affords a means for changing the position of the handle in relation to the electrodes 15 and 16. This change is necessary to accommodate the different size handles. The knife handle is positioned between the spring fingers and properly aligned on electrodes, 11, 12, while the clamping element is held open. After the knife handle has been thus positioned, the clamping element is released and the handle is firmly clamped in place against the electrodes 11, 12. The electrodes may be shaped or recessed so as to accommodate conveniently the handle.

Means are provided for holding the other part to be soldered in position in the apparatus. In the present embodiment, the other part is the knife blade, 35. The blade is equipped with a tang 36, at its rear end which is intended to fit in a socket, 37, in the handle and to be soldered therein. The blade is forced toward the handle so that shoulder, 38, on the blade abuts the end of the handle while the tang is disposed in the socket of the handle. For obtaining such result, a transverse member, 39, is caused to act on the free end of the blade. This member has a slot, 40, into which the blade end extends to some extent. The slot serves to position the knife blade with respect to the handle, to maintain the position of the blade, and prevent its turning in the apparatus.

Means are provided for mounting the transverse member for movement lengthwise of bar, 10. Although capable of various constructions, in that here shown as an example, the transverse member is mounted for rectilinear movement lengthwise of bar, 10. For this purpose the transverse member has a portion, 41, extending perpendicularly thereto and attached to a bar, 42, arranged alongside bar, 10. The portion, 41, may be advantageously fastened to bar, 42, in an adjustable manner to regulate the action of the transverse member on the blade end and to adapt the apparatus for use with knives of various lengths. To this end, the portion, 41, may be equipped with a slot, 43, through which extend set screws, 44, into bar 42. The bar, 42, is guided parallel to bar, 10, during its movements. The illustrated exemplification produces this result by the use of bolts, 45, which pass transversely through bar, 42, through a slot, 46, in bar, 10, and through another bar, 47, the latter being disposed alongside bar, 10, opposite bar, 42, and in a rectilinear groove, 48, in bar, 10. The bolts, 45, keep bars 42 and 47, against the sides of the bar, 10, but the bars, 42 and 47, may move longitudinally of bar, 10, the bolts traveling in the slot, 46, during such movement.

Means are also provided for resiliently forcing the transverse member 39 toward the knife handle. The resilient means illustrated embody a coil spring, 50. One end of the spring is attached to a pin, 51, on bar, 42, the other end to a hook, 52, on a handle, 53. The handle, 53, is affixed to bar, 10, in a transverse direction, and passes through a slot, 54, in bar, 42. The slot permits a limited movement of bar, 42, with respect to bar, 10. The spring acts to force bar, 42, consequently transverse member 39, toward the knife handle portion of the apparatus by pulling pin, 51, toward handle, 53.

Manually actuated means are provided for moving the transverse member, 39, away from the knife end engaged by it. In the example here shown, the means include handle 53 and another handle, 55, secured to bar, 42. These handles are slightly spaced and such as to be squeezed in the hand. When so squeezed, handle, 55, is moved toward handle, 53, slides bars 42 and 47 back and transverse member, 39, out of engagement with the end of the knife.

During the soldering process, the knife handle is clamped in the apparatus, the blade is positioned with the tang in the socket of the handle, and maintained in position by the action of member, 39, on its free end. The solder and flux 60 are first put into the socket before the parts are assembled in the apparatus and the tang inserted. When the parts are properly assembled, the electric circuit is completed by closing the switch and current is caused to flow through that portion of the knife handles between electrodes 11, 12. The handle has considerable resistance and heats up under the action of the current. When the handle is sufficiently heated, the solder melts. The solder gradually spreads down over the tang within the socket under the action of gravity and in time covers practically the entire tang. The solder is, thus, uniformly applied over the surface of the tang within the socket of the handle. The current is then turned off, the handle allowed to cool, and the solder to harden. After cooling and hardening of the solder, the knife is withdrawn from the apparatus.

The cooling may be accelerated by the use of a blast of cold air applied to the knife handle or by dipping in cold water, or both.

The process produces a firm, soldered joint with the solder distributed uniformly over the entire range of tang surface and socket surface. The use of the electric current as the heating medium simplifies the process greatly and, in addition, causes no injury to the knife's handle, and does not appreciably discolor or mar the handle surface. Consequently, the handle may be soldered to the blade after electroplating as well as before.

While the invention has been specifically described and illustrated in application to the soldering of knives, it will be understood that it is capable of application to soldering of parts generally.

What is claimed is:

1. An apparatus for soldering a knife blade to a knife handle, comprising a frame, spaced electrodes carried thereby, means for detachably clamping the knife handle against the electrodes, said handle having a socket for solder, an electric circuit including the electrodes for passing current through that part of the knife handle between the electrodes, means for assembling the knife blade with its tang in the socket of the handle.

2. An apparatus for soldering a knife blade to a knife handle, comprising a frame, spaced electrodes carried thereby, means for detachably clamping the knife handle against the electrodes, said handle having a socket for solder, an electric circuit including the electrodes for passing current through that part of the handle between the electrodes, means for assembling the knife blade with its tang in the socket of the handle, said means embodying a transverse element for engaging the end of the blade and movable longitudinally, resilient means for urging the transverse element to maintain the tang forced into the socket, and manual means for moving the transverse element back against the action of the resilient means to permit assembly of the knife blade.

3. An apparatus for soldering a knife blade to a knife handle, comprising a frame, spaced electrodes carried thereby, means for positioning the knife handle across the electrodes, said means embodying spring fingers for engaging the handle and an adjustably mounted carrier for the fingers, means for detachably clamping the knife against the electrodes, said handle having a socket for solder, an electric circuit including the electrodes for passing current through that part of the handle between the electrodes, and means for assembling the knife blade with its tang in the socket of the handle.

In testimony whereof, I have hereunto set my hand.

ARTHUR H. PARDEW.